(12) United States Patent
Blake

(10) Patent No.: US 7,730,625 B2
(45) Date of Patent: Jun. 8, 2010

(54) GYROSCOPICALLY-ORIENTED SURVEY TOOL

(75) Inventor: Erik Blake, Whitehorse (CA)

(73) Assignee: Icefield Tools Corporation, Whitehorse (CA)

( * ) Notice: Subject to any disclaimer, the term of this patent is extended or adjusted under 35 U.S.C. 154(b) by 397 days.

(21) Appl. No.: 11/721,330

(22) PCT Filed: Oct. 13, 2005

(86) PCT No.: PCT/CA2005/001591

§ 371 (c)(1),
(2), (4) Date: Jun. 8, 2007

(87) PCT Pub. No.: WO2006/063432

PCT Pub. Date: Jun. 22, 2006

(65) Prior Publication Data

US 2009/0217539 A1    Sep. 3, 2009

(30) Foreign Application Priority Data

Dec. 13, 2004  (CA)  .................................... 2492623

(51) Int. Cl.
*E21B 47/022* (2006.01)
*G01C 9/00* (2006.01)

(52) U.S. Cl. .......................................... 33/313; 33/304
(58) Field of Classification Search ................... 33/313, 33/301–304, 312, 324, 1 H
See application file for complete search history.

(56) References Cited

U.S. PATENT DOCUMENTS

| | | | |
|---|---|---|---|
| 4,192,077 A | 3/1980 | Van Steenwyk |
| 4,197,654 A | 4/1980 | Van Steenwyk |
| 4,199,860 A | 4/1980 | Beelitz |
| 4,199,869 A | 4/1980 | Van Steenwyk |
| 4,265,028 A | 5/1981 | Van Steenwyk |
| 4,297,790 A | 11/1981 | Van Steenwyk |
| 4,461,088 A | 7/1984 | Van Steenwyk |
| 4,468,863 A | 9/1984 | Van Steenwyk |
| 4,471,533 A | 9/1984 | Van Steenwyk |
| 4,594,790 A | 6/1986 | Engebretson |

(Continued)

FOREIGN PATENT DOCUMENTS

CA    2476789 A1    2/2005

OTHER PUBLICATIONS

AdK Scientific Drilling, "All Attitude Drop Keeper," Scientific Drilling, www.scientificdrilling.com, available at least as early as Mar. 20, 2004, 1-page brochure.

(Continued)

*Primary Examiner*—Yaritza Guadalupe-McCall
(74) *Attorney, Agent, or Firm*—Christensen O'Connor Johnson Kindness PLLC

(57) ABSTRACT

A gyroscopically-oriented survey tool, includes a housing having an axis. Three accelerometers are mounted in the housing with their axis set orthogonally. A first of the axis is aligned to the axis of the housing. A second of the axis is perpendicular to the first. A third of the axis is perpendicular to both of the first and the second. Three gyroscopes are mounted pseudo-orthogonally in the housing with their axis set at relative angles of other than 90 degrees. None of the axis of the gyroscopes are mounted parallel to the axis of the accelerometers. This configuration permits data from the accelerometers to be used to check the quality of data from the gyroscopes.

10 Claims, 1 Drawing Sheet

U.S. PATENT DOCUMENTS

| | | | |
|---|---|---|---|
| 4,611,405 A | 9/1986 | Van Steenwyk | |
| 4,614,040 A | 9/1986 | Hulsing, II | |
| 4,672,752 A | 6/1987 | Hulsing, II | |
| 4,706,388 A | 11/1987 | Van Steenwyk | |
| 4,812,977 A | 3/1989 | Hulsing, II | |
| 4,833,787 A | 5/1989 | Van Steenwyk | |
| 4,920,655 A | 5/1990 | Van Steenwyk | |
| 5,172,480 A | 12/1992 | Labuc | |
| 5,265,028 A | 11/1993 | Machala, III | |
| 5,432,699 A | 7/1995 | Hache | |
| 5,645,077 A | 7/1997 | Foxlin | |
| 5,657,547 A | 8/1997 | Uttecht | |
| 5,739,431 A | 4/1998 | Petri | |
| 5,807,284 A | 9/1998 | Foxlin | |
| 6,162,191 A | 12/2000 | Foxlin | |
| 6,267,185 B1 | 7/2001 | Mougel | |
| 6,347,282 B2 | 2/2002 | Estes | |
| 6,351,891 B1 * | 3/2002 | MacGugan | 33/304 |
| 6,361,507 B1 | 3/2002 | Foxlin | |
| 6,453,239 B1 | 9/2002 | Shirasaka | |
| 6,480,119 B1 | 11/2002 | McElhinney | |
| 6,484,818 B2 | 11/2002 | Alft | |
| 6,487,782 B1 | 12/2002 | Bond | |
| 6,529,834 B1 | 3/2003 | Estes | |
| 6,553,322 B1 * | 4/2003 | Ignagni | 702/34 |
| 6,631,563 B2 | 10/2003 | Brosnahan | |
| 6,714,870 B1 | 3/2004 | Weston | |
| 6,768,959 B2 * | 7/2004 | Ignagni | 702/94 |
| 2001/0041963 A1 | 11/2001 | Estes | |
| 2003/0023192 A1 | 1/2003 | Foxlin | |
| 2003/0076107 A1 | 4/2003 | Fanini | |
| 2003/0236627 A1 | 12/2003 | Estes | |

OTHER PUBLICATIONS

Specifications, "MI-3 Digital Borehole Survey Tools," Icefield Tools Corporation, www.icefieldtools.com, Whitehorse, Yukon, and Vancouver, BC, Canada, © 2002, 6-page brochure.

Swedish Benchmark Technology, "Battery Powered Gyroscopic Surveying Tool," Stockholm Precision Tools, www.stockholmprecisiontool.com, Upplands, Vasby, Sweden, available at least as early as Mar. 20, 2004, 2-page brochure.

* cited by examiner

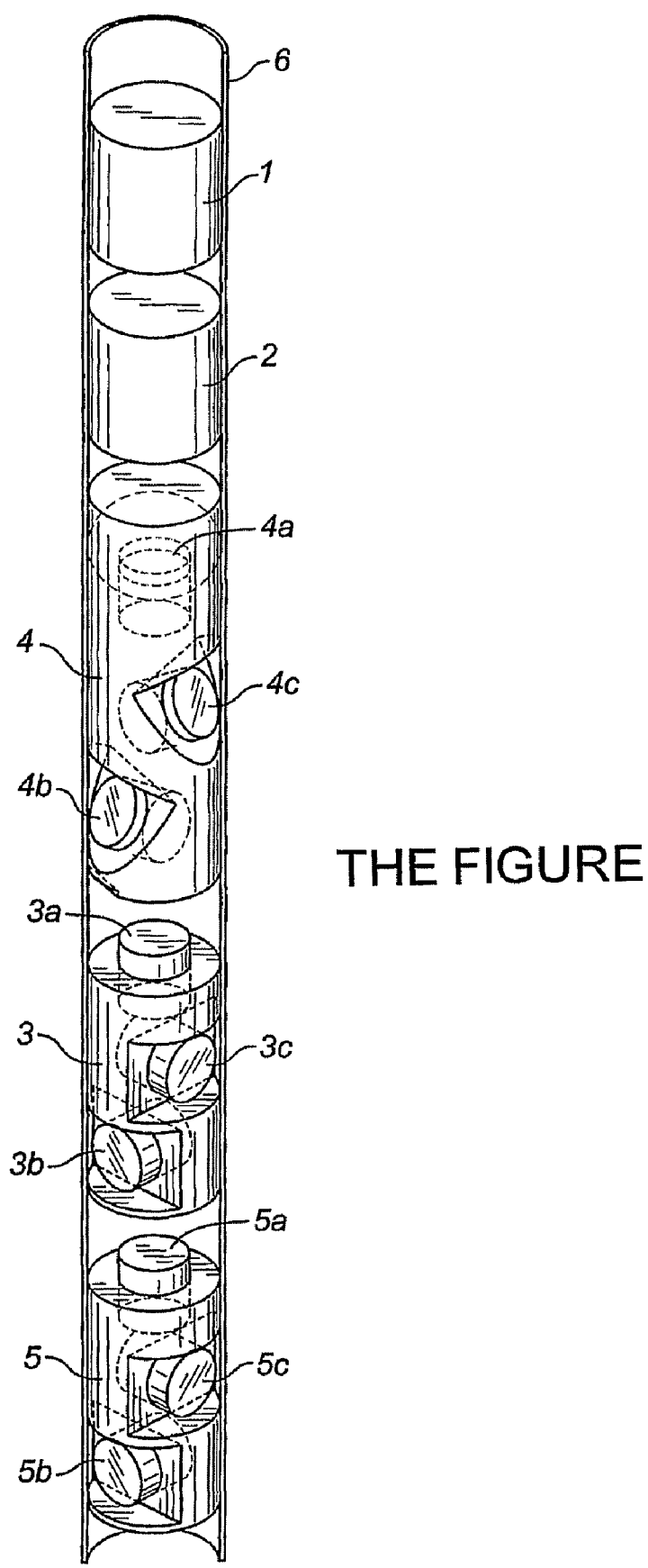
THE FIGURE

GYROSCOPICALLY-ORIENTED SURVEY TOOL

FIELD OF THE INVENTION

The present invention relates to a survey tool that uses gyroscopes to provide azimuth orientation.

BACKGROUND OF THE INVENTION

Boreholes drilled into the ground are rarely straight, owing to the interaction of a rotating drill bit with inhomogeneous ground. Nevertheless, deviation of the borehole is intentional in some instances. To determine the true trajectory, borehole survey instruments are run through the hole. Measurements of dip (or inclination) and azimuth can be made at intervals along the borehole and the results interpolated to derive the trajectory. Sometimes the measurements are made while moving the instrument along the borehole; sometimes the measurements are made at discrete stationary intervals.

Sensing inclination is relatively straightforward. There is considerable prior art related to accelerometers and tiltmeters that can be used to determine the inclination of the instrument axis with the gravitational vertical. Sensing azimuth is more difficult. There are three methods of doing this: (1) using a sensor referenced to an inertial frame of reference (i.e., a gyroscope), (2) using the Earth's magnetic field (i.e., a magnetometer or compass), or (3) integrating changes in curvature of the borehole from an initial surface orientation.

Current gyroscopically-oriented instruments are the most complex and expensive. Typically, they rely on one or two rotating-mass gyroscopes in a gimballed or strap-down mount. As the instrument is run through the borehole, movements of the axis (in the case of gimballed gyroscope) or precessive forces (in the case of a strap-down gyroscope) are measured to obtain the attitude of the instrument. Unfortunately, rotating gyroscopes are sensitive to shock loading, drift, and external magnetic fields. Much of the effort in improving the accuracy of gyroscopically-oriented revolves around compensating for drift in the gyroscopes.

Instruments using the Earth's magnetic field are of relatively simple construction and are therefore the least expensive. Unfortunately, magnetic fields generated by the drilling equipment and/or nearby mineralization can distort the local magnetic field, and hence the reported azimuth. Instruments with three-component magnetometers (e.g., a fluxgate magnetometer) are able to give some diagnostic information such as magnetic field strength and magnetic dip. These diagnostic parameters should be constant for a given geographical location and any significant variation can be taken as an indication that the reported azimuth is less reliable. Additionally, magnetically-oriented survey instruments do not operate well at high geomagnetic latitudes because the Earth's magnetic field is near-vertical.

Integration-type instruments are typically run inside the drill rods. A snug fit between the instrument and the rods ensures that the instrument takes on the same curvature as the rods. As the instrument is run through the rods, the twists and turns of the rods are added up to obtain the borehole trajectory. Unfortunately, measurement errors accumulate and the error of these instruments increases with hole depth.

SUMMARY OF THE INVENTION

According to the present invention there is provided a gyroscopically-oriented survey tool, which includes a housing having an axis. Three accelerometers are mounted in the housing with their axes set orthogonally. A first of the axes is aligned to the axis of the housing. A second of the axes is perpendicular to the first A third of the axes is perpendicular to both of the first and the second. Three gyroscopes are mounted pseudo-orthogonally in the housing with their axes set at relative angles of other than 90 degrees. None of the axes of the gyroscopes are mounted parallel to the axes of the accelerometers.

As will hereinafter be further described, a gyroscopically-oriented borehole survey tool constructed in accordance with the teachings of the present invention enables an operator to use data from the accelerometers to check on the quality of data from the gyroscopes and alerts the operator to the presence of factors which might otherwise distort gyroscope data.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

THE FIGURE is a side elevation view, in section, of a gyroscopically-oriented survey tool constructed in accordance with the teachings of the present invention.

DETAILED DESCRIPTION OF THE PREFERRED EMBODIMENT

The preferred embodiment, a gyroscopically oriented survey tool will now be described with reference to THE FIGURE.

The instrument consists of the following modules: (1) a battery supply, (2) a microprocessor module, (3) an accelerometer module, (4) a gyroscope module, and optionally (5) a magnetometer module. All these elements are housed in a cylindrical pressure vessel or housing (6). The pressure vessel can be opened to change or charge the batteries and to allow connection of a communications cable if a wireless communications link is not provided.

2.1 Battery Supply

The battery (1) could consist of primary (non-rechargeable) or secondary (chargeable) batteries. Battery chemistry is not critical, although environmental considerations (e.g., high ambient temperature) would favour lithium-type batteries.

2.2 Microprocessor

The microprocessor (2) is responsible for a number of tasks:

Communication with the operator or an external computer: Communication could be via a data link (RS232, USB, IRDA, BlueTooth, etc.), a display mounted in the instrument, and/or one or more switch buttons.

Communication with other modules within the instrument. This may involve data links (e.g., SPI, I2C, or other), or digital control signals.

Timekeeping using an on-board real-time clock.

Data storage using RAM and/or FLASH memory.

Power management: The microprocessor can turn off various subsystems, as dictated by operational conditions. For example, it can turn off the sensors and communications modules when they are not required.

Data collection: The microprocessor can digitize analogue signals, or obtain digitized values via internal data links.

Data processing: The microprocessor may perform some or all data processing to compute borehole trajectory parameters.

2.3 Accelerometer Module

The accelerometer module (3) contains three accelerometers with their sensitive axes (3a, 3b, 3c) mounted orthogonally. The sensors may be of any type of accelerometer (e.g., Micro-electrical-mechanical system (MEMS), force balance, etc.) Since the data from the accelerometers is used to derive the local gravitational vertical, their sensitivity should, at a minimum, range from −1 g to +1 g.

Typically, the accelerometers are mounted such that one axis of sensitivity (3a) is aligned with the axis of the tool, the second axis (3b) is perpendicular to the first and is aligned with an external mark on the instrument (not shown), and the third axis (3c) is perpendicular to them both.

2.4 Gyroscope Module

The gyroscope module (4) consists of three gyroscopes mounted with their sensitive axes (4a, 4b, 4c) pseudo-orthogonal. These sensors record the angular velocity in an inertial frame of reference about the sensitive axis. By pseudo-orthogonal, we mean that the three axes are intentionally set at relative angles other than 90°. For example, the three positive axes may be mounted at 100° relative to one another. Additionally, the sensitive axes of the gyroscopes are mounted such that none of them are parallel to the axes of sensitivity of the accelerometers.

During a borehole survey, the gyroscope module provides continuous data (either analogue or digital) signals for each of the three axes.

Because we require that the axes of sensitivity are not mutually-orthogonal, it may not be possible to use rotating-mass rate gyroscopes. This type of gyroscope innately produces output orthogonal to the spin axis, usually taken on two perpendicular axes. It may be possible to modify such a gyroscope to pick off data at non-orthogonal points, but it is simpler to use a type of gyroscope which is sensitive to rotation about only one axis, such as a MEMS gyroscope.

The purpose for this mounting configuration is described below.

2.5 Magnetometer Module

The optional magnetometer module (5) consists of three mutually-orthogonal magnetic field or flux sensors. These could consist of fluxgate sensors, giant magneto-resistive (GMR) sensors, or other types of sensors. The sensitive axes (5a, 5b, 5c) of the magnetometer may be aligned with those of the accelerometers.

Data from the accelerometers and magnetometers may be used to determine the orientation of the instrument in space when magnetic interference is not significant. In such situations, the magnetometers may also be used to corroborate the azimuth obtained by gyroscope data.

2.6 Calibration

The orientation of the various sensor axes relative to the instrument axis and the external mark is known approximately during assembly. Calibration procedures are used to determine the actual orientation of these axes.

3 Method of Operation

This instrument can be run independently (i.e., powered by batteries and not connected to the surface with a power or communications cable) or with real-time data telemetry to the surface through a cable which may also supply power. It is run through the length of a borehole (either in a clear hole, or inside the drilling rods) and is stopped at intervals to allow the system to take readings from the accelerometers with no movement-induced acceleration.

While running a survey, the depth (distance along the borehole) is recorded on a portable computer which is time-synchronized with the instrument. We envisage a system which will take readings from the accelerometers (and magnetometers, if present) at intervals (for example every 5 seconds)—all data are stored onboard, but accelerometer/magnetometer data from instances where the depth is not recorded are not used.

Integrated angular velocity information from the gyroscopes is also recorded at the same intervals.

Before and/or after running a survey, the attitude of the instrument must be measured. The tilt of the instrument can be obtained from the accelerometers and the azimuth from the magnetometer (if present) or other survey methods. If all the sensors and data acquisition was error- and drift-free, then these data could be used to reliably determine the trajectory of the borehole. Unfortunately, this is not the case—there are temperature affects, sensor error and drift, digitization errors, etc. Additionally, shock loading and/or excessive rotation speed can cause the output from the gyros to clip (reach their dynamic limit and cease to accurately represent the input signal).

The stationary reading can be used to recalibrate the zero or null value of the gyroscopes (with the rotation of the Earth superimposed).

Data from the accelerometers can be used to correct for changes in scaling factor in the gyroscopes. This can be done by comparing the real change in tilt of one or more accelerometer axes (as measured at successive stationary positions) with the calculated change obtained by integrating the gyroscope output. By mounting the sensitive axes of the gyroscopes and accelerometers at angles to one another, we ensure that pure rotation about any accelerometer or gyroscope axis will register on more than one of the other sensor type.

In other words, we corroborate the integrated output from the drift-prone gyroscopes with data from the accelerometers. Additional corroboration may, under appropriate conditions, be obtained for magnetometer data (if present).

Furthermore, mounting the gyros psuedo-orthogonally prevents any null positions from occurring. For example, if the gyroscopes were orthogonal, then rotation about a gyroscope axis oriented vertically would produce no change in output from any other accelerometer or gyroscope sensor—we would be unable to corroborate the output of the vertically-oriented gyroscope. By deliberately misaligning the axes, rotation about a vertical gyroscope axis will also affect the output of the other two gyroscopes. Even though it is not possible to correct the scale factor of the vertical gyroscope using the accelerometers, the other two gyroscopes can be corrected, and they in turn can correct the vertical one.

A data quality parameter can be obtained by examining the changes in scale factor (which may represent excessive rotation or shock loading). We can also assess the degree to which the various sensors are interacting. For example, the worst-case scenario is when a gyroscope axis is vertical because the cross-axis sensitivity with the other two gyroscopes and the three accelerometers is at a minimum. Measures of this nature can be used to assess the quality of the survey data.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. An apparatus for determining a special orientation of a gyroscopically oriented survey tool, comprising:

a housing having an axis;

three accelerometers mounted in the housing having their respective sensitive axis set orthogonally, a first of the axis being aligned to the axis of the housing, a second of the axis being perpendicular to the first, and a third of the axis being perpendicular to both of the first axis and the second axis; and three gyroscopes mounted pseudo-orthogonally in the housing with their respective sensitive axis set at relative angles of other than 90 degrees, none of the axis of the gyroscopes being mounted parallel to the axis of the accelerometers, such arrangement ensuring that any housing rotation will affect at least two gyroscopes and such arrangement ensuring that any housing rotation about any non-vertical gyroscope axis will affect at least one accelerometer;

means for using corroborating data from the accelerometers to correct offset factors of the gyroscopes;

means for using corroborating data from the accelerometers to correct scale factors of those of the gyroscopes having a non-vertical sensitive axis; and means for correcting the scale factor of one of the gyroscopes having a vertical sensitive axis by using data from non-vertical gyroscopes whole scale factors have been corrected.

2. The apparatus as defined in claim 1, wherein means are provided for recording and/or integrating data from the accelerometers and data from the gyroscopes.

3. The apparatus as defined in claim 1, wherein there is further provided three magnetic field sensors or magnetic flux sensors mounted in the housings, the magnetic sensors having respective axis set orthogonally to serve as a magnetometer.

4. The apparatus as defined in claim 3, wherein the respective sensitive axis of the magnetometer are aligned with the respective sensitive axis of the accelerometers.

5. The apparatus as defined in claim 3, wherein means are provided for computing an apparatus azimuth using accelerometer and magnetometer data and using such apparatus azimuth to correct the gyroscope offset and the scale factors.

6. The apparatus as defined in claim 1, wherein means are provided for determining a quality of the determined apparatus orientation by assessing the degree to which the gyroscope offset and the scale factors are constrained.

7. A method of providing a special orientation of a gyroscopically oriented survey tool, the method comprising the steps of:

providing a gyroscopically-oriented survey tool which includes:

a housing having an axis;

three accelerometers mounted in the housing with their respective sensitive axis set orthogonally, a first of the axis being aligned to the axis of the housing, a second of the axis being perpendicular to the first, and a third of the axis being perpendicular to both of the first axis and the second axis;

three gyroscopes mounted pseudo-orthogonally in the housing, the gyroscopes having their respective sensitive axis set at relative angles of other than 90 degrees, none of the axis of the gyroscopes being mounted parallel to the sensitive axis of the accelerometers, such arrangement ensuring that any housing rotation will affect at least two gyroscopes and such arrangement ensuring that any housing rotation about any non-vertical gyroscope axis will affect at least one accelerometer;

using corroborating data from the accelerometers to correct offset factors of the gyroscopes;

using corroborating data from the accelerometers to correct scale factors of those of the gyroscopes having a non-vertical sensitive axis; and using data from gyroscopes whose scale factors have been corrected to correct the scale factor of one of the gyroscopes having a vertical sensitive axis.

8. The method as defined in claim 7, wherein the gyroscopically-oriented survey tool includes three magnetic field sensors or magnetic flux sensors mounted in the housing with their respective sensitive axis set orthogonally to serve as a magnetometer; and wherein the method includes:

computing an apparatus azimuth using accelerometer and magnetometer data, and using such apparatus azimuth to correct gyroscope offset and scale factors.

9. The method as defined in claim 8, wherein the respective sensitive axis of the magnetometer are aligned with the respective sensitive axis of the accelerometers.

10. The method as defined in claim 8, including a step of determining a quality of the derived apparatus orientation by assessing the degree to which the gyroscope offset and the scale factors are constrained.

* * * * *

UNITED STATES PATENT AND TRADEMARK OFFICE
CERTIFICATE OF CORRECTION

PATENT NO. : 7,730,625 B2
APPLICATION NO. : 11/721330
DATED : June 8, 2010
INVENTOR(S) : E. Blake It is certified that error appears in the above-identified patent and that said Letters Patent is hereby corrected as shown below:

| COLUMN | LINE | ERROR |
|---|---|---|
| (57) Pg. 1, col. 2 | Abstract 3 of text | "axis" should read --axes-- |
| (57) Pg. 1, col. 2 | Abstract 3 of text | "axis" should read --axes- |
| (57) Pg. 1, col. 2 | Abstract 4 of text | "axis" should read --axes-- |
| (57) Pg. 1, col. 2 | Abstract 5 of text | "axis" should read --axes-- |
| (57) Pg. 1, col. 2 | Abstract 7 of text | "axis" should read --axes-- |
| (57) Pg. 1, col. 2 | Abstract 8 of text | "axis" should read --axes-- |
| (57) Pg. 1, col. 2 | Abstract 9 of text | "axis" should read --axes-- |
| 5 (Claim 1, | 11 line 5) | "axis" should read --axes-- |
| 5 (Claim 1, | 13 line 7) | "axis" should read --axes-- |

Signed and Sealed this
Twelfth Day of April, 2011

David J. Kappos
*Director of the United States Patent and Trademark Office*

CERTIFICATE OF CORRECTION (continued)
U.S. Pat. No. 7,730,625 B2

| COLUMN | LINE | ERROR |
|---|---|---|
| 5 (Claim 1, | 14 line 8) | "axis" should read --axes-- |
| 5 (Claim 1, | 17 line 11) | "axis" should read --axes-- |
| 5 (Claim 1, | 18 line 12) | "axis" should read --axes-- |
| 5 (Claim 1, | 19 line 13) | "axis" should read --axes-- |
| 5 (Claim 3, | 39 line 3) | "housings" should read --housing-- |
| 5 (Claim 3, | 40 line 4) | "axis" should read --axes-- |
| 5 (Claim 4, | 42 line 2) | "axis" should read --axes-- |
| 5 (Claim 4, | 43 line 3) | "axis" should read --axes-- |
| 6 (Claim 7, | 10 line 8) | "axis" should read --axes-- |
| 6 (Claim 7, | 11 line 9) | "axis" should read --axes-- |
| 6 (Claim 7, | 12 line 10) | "axis" should read --axes-- |
| 6 (Claim 7, | 13 line 11) | "axis" should read --axes-- |
| 6 (Claim 1, | 17 line 15) | "axis" should read --axes-- |
| 6 (Claim 7, | 18 line 16) | "axis" should read --axes-- |

CERTIFICATE OF CORRECTION (continued)
U.S. Pat. No. 7,730,625 B2

| COLUMN | LINE | ERROR |
|---|---|---|
| 6 (Claim 7, | 19 line 17) | "axis" should read --axes-- |
| 6 (Claim 8, | 36 line 4) | "axis" should read --axes-- |
| 6 (Claim 9, | 43 line 2) | "axis" should read --axes-- |
| 6 (Claim 9, | 44 line 2) | "axis" should read --axes-- |